United States Patent [19]

Gattermann et al.

[11] Patent Number: 4,798,271
[45] Date of Patent: Jan. 17, 1989

[54] COMBINATION NORMAL-SOWING AND FINE-SOWING WHEEL WITH INTEGRAL STOP

[75] Inventors: Bernd Gattermann, Hude i.O.; Bernhard Steenken, Sogel; Franz Grosse-Scharmann, Hude i.O.; Horst Müller, Georgsmarienhutte, all of Fed. Rep. of Germany

[73] Assignee: Amazonen Werke, H. Dreyer GmbH. Co. KG, Hasbergen-Gaste, Fed. Rep. of Germany

[21] Appl. No.: 893,123

[22] Filed: Aug. 1, 1986

[30] Foreign Application Priority Data

Aug. 2, 1985 [DE] Fed. Rep. of Germany ....... 3527759
Jan. 22, 1986 [DE] Fed. Rep. of Germany ....... 3605768

[51] Int. Cl.⁴ .......................... A01C 7/12; F16D 67/02
[52] U.S. Cl. ................................. 192/18 R; 192/67 P; 74/527
[58] Field of Search ............... 192/67 P, 114 R, 18 R; 74/527; 403/326; 248/188.5

[56] References Cited

U.S. PATENT DOCUMENTS

| | | | |
|---|---|---|---|
| 1,889,063 | 11/1932 | Dunham | 403/326 |
| 2,415,180 | 2/1947 | John | 403/326 X |
| 2,684,142 | 7/1954 | Willyard et al. | 192/114 R X |
| 3,369,265 | 2/1968 | Halberstadt et al. | 403/326 X |
| 3,811,455 | 5/1974 | Thur | 248/188.5 X |
| 3,869,030 | 3/1975 | Masaki | 192/114 R X |

FOREIGN PATENT DOCUMENTS

| | | |
|---|---|---|
| 501918 | 3/1951 | Belgium . |
| 837022 | 4/1952 | Fed. Rep. of Germany . |
| 1217517 | 5/1960 | France . |

*Primary Examiner*—Leslie A. Braun
*Assistant Examiner*—Richard M. Lorence
*Attorney, Agent, or Firm*—Sprung Horn Kramer & Woods

[57] ABSTRACT

A combination normal-sowing and fine-sowing wheel for a sowing machine, which has a fine-sowing wheel which can be attached to a sowing shaft by an interlocking and clamping connection and is mounted next to a normal-sowing wheel as a separate component in a sowing housing on the same sowing shaft. The fine-sowing wheel is coupled to the normal sowing-wheel by a coupling bolt that can be secured in two operating positions by stops and both the normal sowing wheel and the fine sowing wheel have a central bore and another bore the accommodates the coupling bolt. The stop in accordance with the present invention is in one piece.

16 Claims, 2 Drawing Sheets

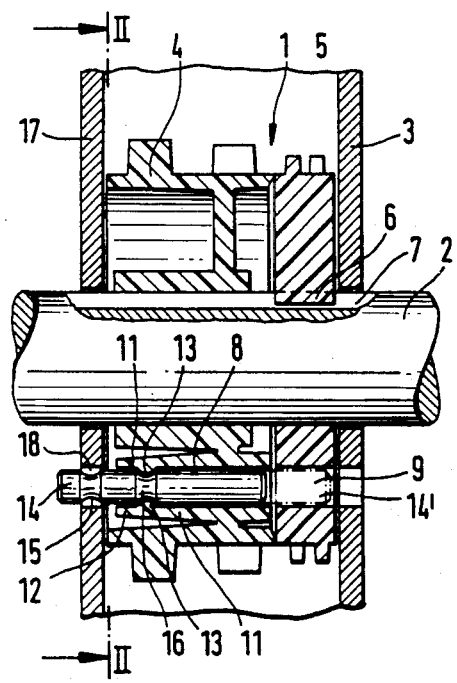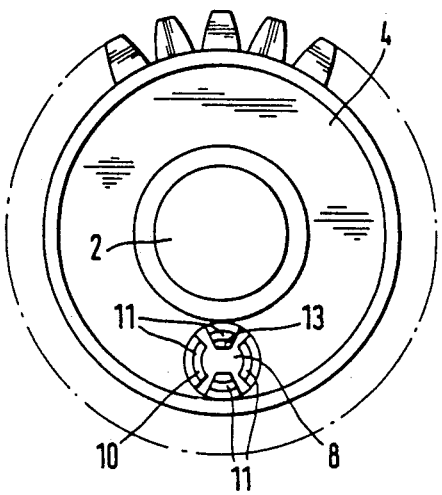
FIG. 1　　　　FIG. 2
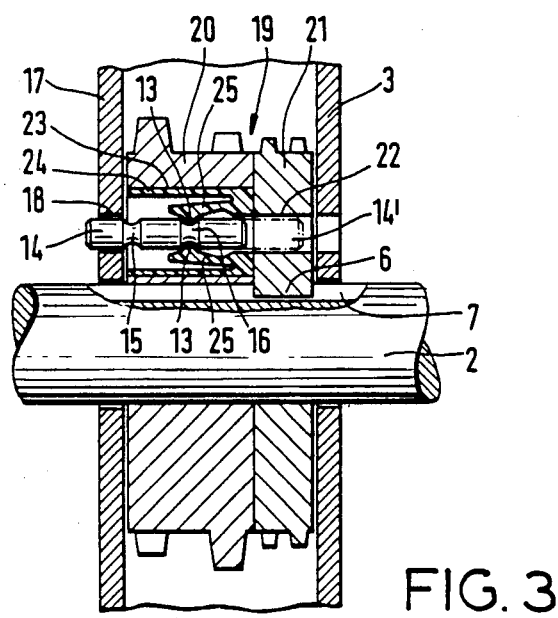
FIG. 3

COMBINATION NORMAL-SOWING AND FINE-SOWING WHEEL WITH INTEGRAL STOP

BACKGROUND OF THE INVENTION

The present invention relates to a combination normal-sowing and fine-sowing wheel for sowing machines, wherein a fine-sowing wheel can be attached to a sowing shaft by means of an interlocking and clamping connection and is mounted next to a normal-sowing wheel as a separate component in a sowing housing on the same sowing shaft, wherein the fine-sowing wheel can be coupled to the normal-sowing wheel by means of a coupling bolt that can be secured in two operating positions by means of stops and wherein both the normal-sowing wheel and the fine-sowing wheel have, in addition to a central bore, another bore that accommodates the coupling bolt.

A combination normal-sowing and fine-sowing wheel of this type is known from German Pat. No. 837,022. The stops for the coupling bolt in this known sowing wheel are very expensive to manufacture. Mounting the stops in particular demands a lot of expensive and time-consuming manual labor. The normal-sowing wheel has a radial bore to accommodate the stops. The radial bore intersects with the bore that accommodates the coupling bolt. Mounting the stops is a complicated process, involving inserting the coupling bolt in its bore in the normal-sowing wheel, positioning a ball that operates in relation to the stops and in conjunction with grooves in the coupling bolt in the radial bore, inserting in the same bore a spring that operates in conjunction with the stops, and screwing into the bore the grub screw that secures the stops. The expense of manufacturing and assembling the stops is accordingly absolutely unacceptable.

SUMMARY OF THE INVENTION

The object of the present invention is to simplify the stops and the manufacture and assembly of the sowing wheels.

This object is attained in accordance with the invention in that the stops are in one piece. This results in a very simple stop. The one-piece stops in one embodiment can be inserted in the normal-sowing wheel. This is a very simple means of ensuring that the one-piece stop is inserted in an opening that accommodates it. The stops in one preferred embodiment are in one piece with the normal-sowing wheel. This embodiment accordingly necessitates absolutely no additional assembly labor to insert the stops in the normal-sowing wheel. The stops are integrated into the normal-sowing wheel in a very simple way simultaneously with the manufacture of the wheel. This is especially simple to attain if the normal-sowing wheel is made out of plastic because the stops can be molded directly onto it. The stops which are either one-piece or in one piece with the normal-sowing wheel, in one preferred embodiment are inherently elastic tongues that extend axially and have a cam-like nose on their free end, the end that faces the bore. This is an extremely simple way of attaining inherently elastic stops. The cam-like noses operate in conjunction with associated grooves in the coupling bolt, reliably securing the bolt in the particular position in a surprisingly simple way.

To ensure reliable retention of the coupling bolt at all times, at least one elastic stop is provided that rests on a supporting component between the normal-sowing wheel and the stop.

This ensures long life and long-term operation for the stops and accordingly a precise stopping of the coupling bolt at any time.

In one embodiment of the invention there is only one elastic stop. The supporting component can be positioned between the hub and the circumference of the normal-sowing wheel, and the stop can rest on the supporting component. Thus the stop still consists of only one elastic component, with the supporting component, which consists of two circular segments, designed so that even long-term deformation does not lead to plastic deformation and constantly ensures retention of the coupling bolt. Since the normal-sowing and fine-sowing wheel are made out of plastic, the supporting component and the stop are made extremely simply, in one piece with the normal-sowing wheel, since the subassembly is molded on.

The bore or the coupling bolt in this embodiment has a U-shape cross-section. The side that faces the circular section of the bore or of the coupling bolt can be a flat surface with the cam-shaped nose, in the form of a stop, in its vicinity. This provides an especially effective accommodation for the coupling bolt. The contact surface between the stop and the coupling bolt is accordingly expanded in an especially practical way, ensuring reliable retention of the coupling bolt. The coupling bolt in this case can also be made out of plastic for example.

As elastic component that acts radially is positioned between the normal-sowing wheel and the fine-sowing wheel in one especially practical embodiment. The elastic component is always a disk spring and is coupled to one of the two sowing wheels, preferably to the normal-sowing wheel, and is an elastic component that acts on the hub of the fine-sowing wheel. This measure forces both the fine-sowing wheel and the normal-sowing wheel against the walls of the sowing housing in a practical way, preventing the undesired deposits of corrosive materials and dust that occur in the cracks between these components of the sowing system with known flow regulators and preventing very fine seed from leaving the sowing housing uncontrolled.

Some preferred embodiments of the invention will now be described with reference to the attached drawings, wherein:

BRIEF DESCRIPTION OF THE DRAWINGS

FIG. 1 is a section through a combination normal-sowing and fine-sowing wheel in accordance with the invention, FIG. 2 is a side view along the line II—II of FIG. 1 of the normal-sowing wheel, FIG. 3 is a section through another embodiment of a combination normal-sowing and fine-sowing wheel.

DETAILED DESCRIPTION OF THE PREFERRED EMBODIMENTS

Figure 4:
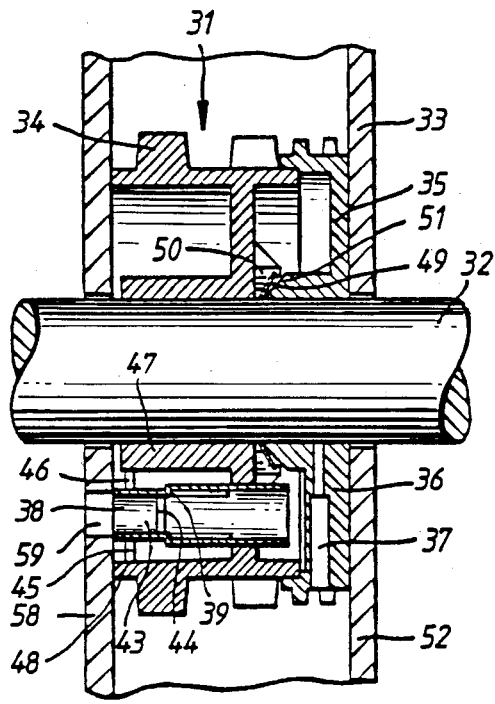
FIG. 4 is a section through still another embodiment of a combination normal-sowing and fine-sowing wheel without a coupling bolt.

The combination normal-sowing and fine-sowing wheel 1 illustrated in FIGS. 1 and 2 is mounted on a sowing shaft 2 inside a sowing housing 3. Combination wheel 1 consists of a normal-sowing wheel 4 and of a fine-sowing wheel 5 accommodated next to each other in sowing housing 3. Fine-sowing wheel 5 has molded-on groove splines 6 positioned in a groove 7 in sowing shaft 2, providing an interlocking connection between the fine-sowing wheel and the sowing shaft. Both normal-sowing wheel 4 and fine-sowing wheel 5 have a bore 8 and 9 at the same distance from their central bore. Stops 10, which are in one piece with normal-sowing wheel 4, are positioned around bore 8. Stops 10 have four tongues 11 uniformly distributed around the circumference of bore 8. Two of the tongues are larger and two smaller, and the smaller and larger tongues are opposite one another. Tongues 11 extend axially and are inherently elastic. Tongues 11 are secured on one side to normal-sowing wheel 4. At their free end 12 on the part that faces the axis of bore 8, each tongue 11 has a cam-shaped nose 13. The area between cam-shaped nose 13 and the point where the tongues are secured to normal-sowing wheel 4 is inherently elastic.

A coupling bolt 14 slides in the bores 8 and 9 in normal-sowing wheel 4 and fine-sowing wheel 5. Coupling bolt 14 is surrounded by two grooves 15 and 16. The cam-shaped noses 13 on tongues 11 operate in conjunction with grooves 15 and 16. The inherent elasticity of tongues 11 forces nose 13 against coupling bolt 14 and accordingly, depending on the position of the coupling bolt, into grooves 15 or 16.

This design makes it possible to shift coupling bolt 14 into two different operating positions. In the position illustrated in FIG. 1, the left-hand outer section of coupling bolt 14 engages a bore 18 in the left wall 17 of sowing housing 3. When the bolt is in this position, sowing shaft 2 will drive only fine-sowing wheel 5, distributing rows of fine seed in particular.

In the other position, represented by means of the broken lines, coupling bolt 14' has been forced out of bore 18 and is engaging both normal-sowing wheel 4 and fine-sowing wheel 5. In this position, sowing shaft 2 drives both normal-sowing wheel 4 and fine-sowing wheel 5, both of which are distributing seed.

In contrast to the wheels illustrated in FIG. 1, the combination normal-sowing and fine-sowing wheels 19 illustrated in FIG. 3 are made out of metal. Normal-sowing wheel 20 and fine-sowing wheel 21 are mounted inside a sowing housing 3 on a sowing shaft 2. Fine-sowing wheel 21 has a groove spline 6 that engages a groove 7 in sowing shaft 2. Fine-sowing wheel 21 has, at a distance from its central bore, a bore 22, which can be engaged by a coupling bolt 14. Normal-sowing wheel 20 also has a larger bore 23 at the same distance from the central bore of fine-sowing wheel 21 as bore 22. Bore 23 accommodates a stop 24. Stop 24 is in one piece and made out of plastic. It has inherently elastic tongues 25 that extend axially. The free end of each tongue 25, the end facing coupling bolt 14, has a cam-shaped nose 13. Noses 13 operate in conjunction with grooves 15 and 16 in coupling bolt 14. Thus, combination normal-sowing and fine-sowing wheel 19 functions like the combination normal-sowing and fine-sowing wheel 1 illustrated in FIGS. 1 and 2.

Figure 5:
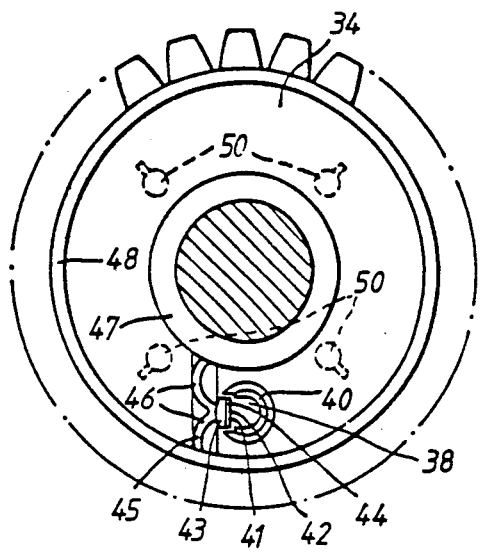
FIG. 5 is a side view of the normal-sowing wheel illustrated in FIG. 4 along line V—V.
Figure 9:
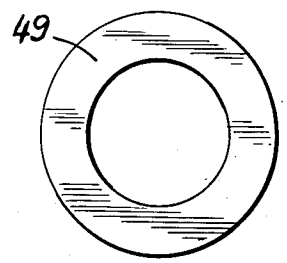
FIG. 9 illustrates the disk spring in the form of an elastic element illustrated in FIG. 4.

The combination normal-sowing and fine-sowing wheel 31 shown in FIGS. 4 and 5 is mounted on a sowing shaft 32 inside a sowing housing 33. Combination wheel 31 consists of a normal-sowing wheel 34 and of a fine-sowing wheel 35 accommodated next to each other in sowing housing 33. Fine-sowing wheel 35 has a molded-on contact surface 36, in which there is a radial groove 37. A grub screw that screws into the groove 37 in fine-sowing wheel 35 secures the wheel to sowing shaft 32. Normal-sowing wheel 34 has an axial bore 38 with a U-shaped cross-section and two different diameters, creating an edge 39 inside bore 38. The side 41 that faces the circular section 40 of bore 38 is a flat surface 42, with an elastic stop 43 in its vicinity. Stop 43 has a cam-shaped nose 44 and rests on a supporting component 45 between normal-sowing wheel 34 and stop 43. Supporting component 45 is elastic and consists of two arcuate segments 46 between the hub 47 and the circumference 48 of normal-sowing wheel 34 that support stop 43. Between normal-sowing wheel 34 and fine-sowing wheel 35 is an elastic component in the form of a disk spring 49 that acts axially. Disk spring 49 shown in FIG. 9 is mounted at the four bearing points 50 of normal-sowing wheel 34 and acts on the hub 51 of fine-sowing wheel 35, forcing the two wheels 34 and 35 in opposite directions against the particular walls 52 of the sowing housing.

Figure 7:
FIG. 7 is a front view of the coupling bolt illustrated in FIG. 6.
Figure 8:
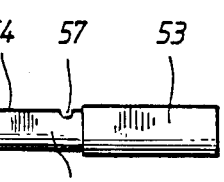
FIG. 8 is a side view of the coupling bolt illustrated in FIG. 6.

A U-shaped coupling bolt 53 shown in FIGS. 7 and 8 and made out of plastic slides back and forth in the bore 38 in normal-sowing wheel 34. Coupling bolt 53 has two grooves 56 and 57 in the flat surface 54 in the vicinity of its smaller cross-section 55. The cam-shaped nose 44 on stop 43 operates in conjunction with grooves 56 and 57. The inherent elasticity of stop 43 forces cam-shaped nose 44 against coupling bolt 53 and accordingly, depending on the position of the coupling bolt, into grooves 56 or 57.

Figure 6:
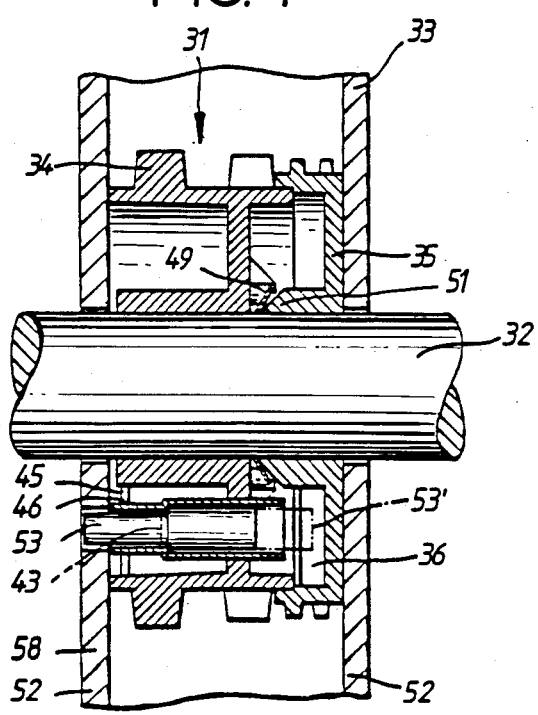
FIG. 6 is a section through the embodiment of a combination normal-sowing and fine-sowing wheel illustrated in FIG. 4 but with the coupling bolt.

This design makes it possible to shift coupling bolt 53 into two different operating positions. In the position illustrated in FIG. 6, the left-hand outer section of coupling bolt 53 engages the bore 59 in the left wall 58 of sowing housing 33. When the bolt is in this position, sowing shaft 32 will drive only fine-sowing wheel 5, distributing rows of fine seed in particular.

In the other position, represented by means of the broken lines, coupling bolt 53' has been forced out of bore 59 and extends so close to fine-sowing wheel 5 that it comes to rest against contact surface 36. In this position, sowing shaft 2 drives both normal-sowing wheel 34 and fine-sowing wheel 5, both of which are distributing seed.

The different diameters of bore 38 and the different cross-sections of coupling bolt 53 prevent the bolt from being completely forced out of bore 38 because most of its cross-section comes to rest against edge 39. Thus, it is impossible to completely drive coupling bolt 53 out of bore 38.

It will be appreciated that the instant specification and claims are set forth by way of illustration and not limitation, and that various modifications and changes may be made without departing from the spirit and scope of the present invention.

What is claimed is:

1. In a sowing machine having a combination normal-sowing and fine-sowing wheel said normal-sowing wheel having a central bore and being freely rotatably mounted on a sowing shaft passing through the central bore for rotation relative thereto in a sowing housing of the machine, said fine-sowing wheel also having a central bore and being fixedly mounted on the sowing shaft with said sowing shaft passing through the central bore of the fine-sowing wheel, said fine-sowing wheel being disposed adjacent to the normal-sowing wheel in the sowing housing, means for coupling the normal sowing wheel to the fine-sowing wheel for rotation therewith comprising a coupling bolt, means slidably mounting the coupling bolt on the normal-sowing wheel, means on the fine-sowing wheel for coacting with the coupling bolt to rotatably couple the two wheels and means for securing the bolt in one operating position wherein the two wheels are rotatably uncoupled with said normal-sowing wheel being fixed to said housing and another operating position wherein the two wheels are rotatably coupled, the improvement wherein the mounting means comprises means forming a second bore on the normal-sowing wheel for slidably receiving the coupling bolt and wherein the securing means comprises means forming at least one stop is wherein the means forming the at least one stop and the means forming the second bore are in one piece with each other and made out of plastic.

2. The sowing machine as in claim 1, wherein the normal sowing wheel has an insert bore and wherein the one piece means forming the second bore and the means forming the at least one stop is inserted in the insert bore of the normal-sowing wheel.

3. The sowing machine as in claim 1, wherein the one piece means forming the second bore and the means forming the at least one stop is in one piece with the normal-sowing wheel and made out of plastic.

4. The sowing machine as in claim 1, wherein the means forming the at least one stop comprises inherently elastic tongues that extend axially and have a cam-like nose on a free end on a part that faces axis of the second bore.

5. The sowing machine as in claim 4, wherein the tongues are distributed at least approximately uniformly around the circumference of the second bore.

6. The sowing machine as in claim 1, wherein the normal sowing wheel and the at least one stop comprise one piece of plastic.

7. The sowing machine as in claim 1, wherein the at least one stop is elastic and rests on a supporting component disposed between the normal-sowing wheel and the at least one stop.

8. The sowing machine as in claim 7, comprising: only one elastic stop.

9. The sowing machine as in claim 7, wherein the second bore and the coupling bolt have a U-shaped cross-section.

10. The sowing machine as in claim 9, wherein a side of the at least one stop that faces a circular section of the second bore and the coupling bolt have a flat surface with a cam-shaped nose.

11. The sowing machine as in claim 7, wherein the supporting component is positioned between a hub and the circumference of the normal-sowing wheel, and the stop rests on the supporting component.

12. The sowing wheel machine as in claim 11, wherein the supporting component comprises two arcuate segments and is elastic.

13. The sowing machine as in claim 7, wherein the supporting component and the at least one stop are in one piece with the normal-sowing wheel.

14. The sowing machine as in claim 7, further comprising an elastic component that acts axially and which is positioned between the normal-sowing wheel and the fine-sowing wheel.

15. The sowing machine as in claim 14, wherein the elastic component comprises a disk spring.

16. The sowing machine as in claim 14, wherein the elastic component is coupled to one of the two sowing wheels and acts on a hub of the fine-sowing wheel.

* * * * *